W. F. SHERMAN.
LIQUID MEASURE.
APPLICATION FILED NOV. 16, 1917.
1,267,468.
Patented May 28, 1918.
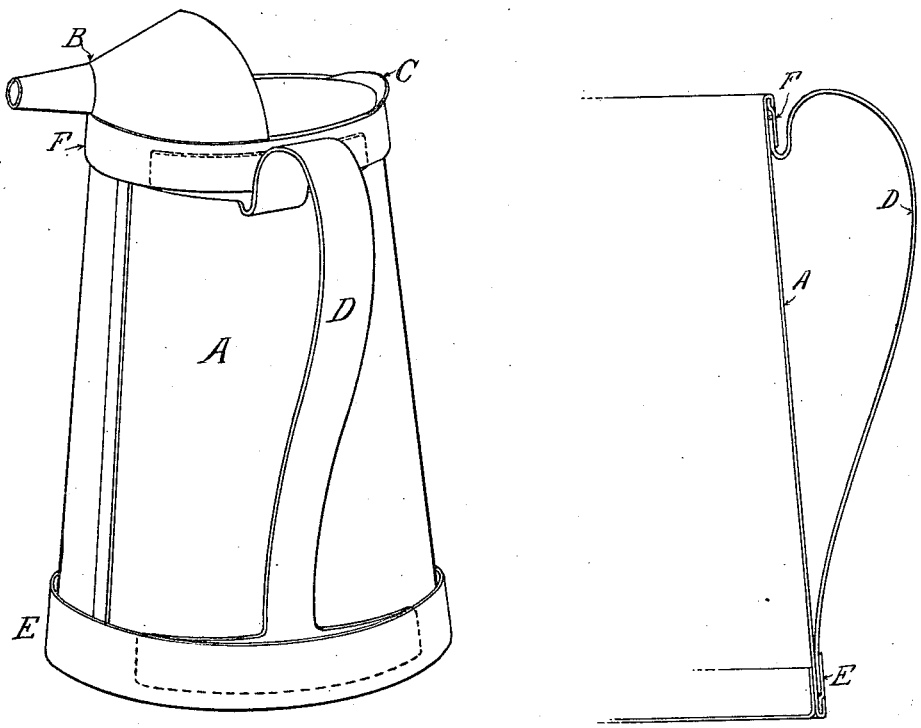
Fig. 1.
Fig. 2.
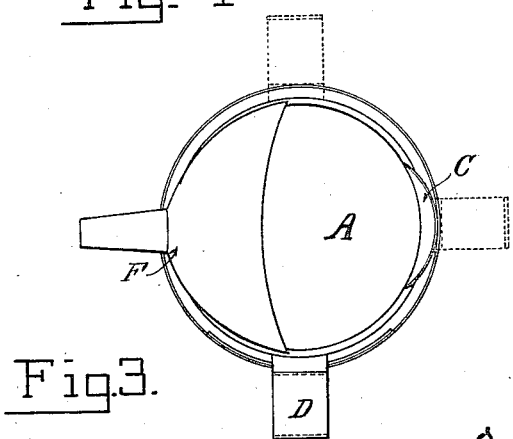
Fig. 3.
Inventor
Walter F. Sherman
by Walter E. Ward.
Atty.

UNITED STATES PATENT OFFICE.

WALTER F. SHERMAN, OF ELSMERE, NEW YORK.

LIQUID-MEASURE.

1,267,468.  Specification of Letters Patent.  Patented May 28, 1918.

Application filed November 16, 1917. Serial No. 202,355.

*To all whom it may concern:*

Be it known that WALTER F. SHERMAN, a citizen of the United States, residing at Elsmere, in the county of Albany and State of New York, has invented certain new and useful Improvements in Liquid-Measures, of which the following is a specification.

My invention relates to liquid measures and the object of my invention is to construct a liquid measure which will have a funnel and a lip at the top and will have an adjustable handle which may be moved around so that the person pouring liquid from the measure can move the handle around the sides of the measure so as to be in the position most convenient for the user to pour the liquid either through the funnel or over the lip, as may be most desirable.

I obtain this object by means of a measure constructed as shown in the accompanying drawings, in which—

Figure 1 is a perspective view of my liquid measure with a funnel and a lip on the top and an adjustable handle on the side.

Fig. 2 is a partial side elevation of my liquid measure in section showing the method of attaching the handle to the measure.

Fig. 3 is a top plan view of my liquid measure, as shown in Fig. 1, with the adjustable handle shown in dotted lines in different locations.

Similar letters refere to similar parts throughout the several views.

Referring to the drawings, A represents my liquid measure, B is a funnel through which the liquid can be poured, C is a lip over which the liquid may be poured, D is an adjustable handle for the user to take in his hand in using the measure, E is a band around the bottom of the measure A. The band E fits sufficiently loose to allow the lower part of the handle D to be inserted between the band E and the surface of the measure A. F is a similar band around the upper portion of the measure A. The band F fits sufficiently loose around the measure A to permit the upper part of the handle D to be inserted between the band F and the surface of the measure A, as shown in Fig. 2. The handle D may be of any suitable formation.

The bands E and F may be formed and attached to the measure A in any suitable manner so that a person taking hold of the handle D may raise the measure A, when full of liquid, and discharge the same, either through the funnel B or over the lip C, as may be desired. The handle D, having its lower end inserted between the band E and the measure A and the upper end inserted between the band F and the measure A, may be slid around on the side of the measure A, so as to be opposite the funnel B, or such other position as may be desired, and when in this position the measure A may be raised by the handle D and the liquid contained in the measure A poured from the measure A in such manner as may be desired. The handle D, being slidable, may be moved in such a position that the user may grasp it with his left hand and the liquid poured from the measure A in place where it could not conveniently be poured if the hande was attached fixedly in a specific position.

What I claim as my invention and desire to secure by Letters Patent is—

1. In a liquid measure, a funnel attached thereto on one side of the opening, a lip attached on another side, an adjustable handle adapted to be moved slidably around the side of the measure to a position opposite the funnel and to a position opposite the lip, as may be desired.

2. A liquid measure, consisting of the body of the measure, a funnel fixedly attached to the top on one side, a lip fixedly attached to the top on another side, a band around the bottom of the measure adapted to receive the end of the handle between the band and the surface of the measure, another band around the top of the measure adapted to receive the upper end of the handle between the second named band and the surface of the measure whereby liquid contained in the measure may be discharged through the funnel and also over the lip of the measure, as may be desired, substantially as described and for the purposes mentioned.

In testimony whereof I have affixed my signature in the presence of two witnesses.

WALTER F. SHERMAN.

Witnesses:
 WALTER E. WARD,
 MINNIE MONTANYE.

Copies of this patent may be obtained for five cents each, by addressing the "Commissioner of Patents, Washington, D. C."